United States Patent Office 3,503,765
Patented Mar. 31, 1970

3,503,765
HIGH TEMPERATURE ALUMINA-SILICA FIBERS AND METHOD OF MANUFACTURE
Joseph E. Blaze, Jr., Alliance, Ohio, assignor to The Babcock & Wilcox Company, New York, N.Y., a corporation of New Jersey
No Drawing. Continuation-in-part of application Ser. No. 527,105, Feb. 14, 1966. This application Feb. 15, 1968, Ser. No. 705,611
Int. Cl. C04b 35/18
U.S. Cl. 106—65                                      9 Claims

ABSTRACT OF THE DISCLOSURE

A high temperature fiber formed of alumina and silica having a predominant mullite crystalline phase and containing modifying metal oxides from the group $B_2O_3$, $P_2O_5$ and $TiO_2$. The crystals are formed from a mother liquid containing the base materials at generally atmospheric temperature and subsequently treated to form the oxides of the finished fiber.

---

This application is a continuation-in-part of my application S.N. 527,105, filed Feb. 14, 1966, now abandoned.

This invention relates to the production of alumina-silica base fibers suitable for use at high temperatures for insulation and reinforcement purposes, and more particularly to a process of making polycrystalline fibers of this type having very high mechanical strength, low thermal conductivity and excellent thermal stability at use temperatures of 2500 F. and higher.

Alumina-silica refractory materials having a fusion point in the range of 2900–3350 F. are now being used for the manufacture of refractory fiber. For example, Georgia kaolin can be heated in an electric melting furnace to a temperature above its fusion temperature. The molten material is tapped through a bottom nozzle and the falling stream is hit by a high velocity stream of air or steam and shredded into fibers of various lengths which are subsequently collected. Kaolin fibers suitable for insulation purposes at use temperatures up to 2000 F. and for short periods up to 2200 F. can be made in this manner (U.S. Patent 2,674,539). Such fibers have a chemical analysis including approximately $Al_2O_3$ 45.5% and $SiO_2$ 50.5% by weight.

Mullite fibers suitable for similar use temperature conditions can also be made in this manner. Such fused fibers will have approximately the following chemical analysis:

|  | Percent by weight |
|---|---|
| $Al_2O_3$ | 68.1 |
| $SiO_2$ | 26.5 |
| $Fe_2O_3$ | 2.1 |
| $TiO_2$ | 2.7 | the remainder being impurities in the batch melted. The mullite fibers are slightly finer, but of lower abrasion resistance than the kaolin fibers.

Such refractory aluminum silicate fibers begin to devitrify at temperatures above 1700 F., a mullite crystalline phase developing in the fiber when heated to 1800 F. This devitrification process inducing excessive shrinkage is the phenomenon that limits the use of such fibers to 2200 F.

The main object of my present invention is the production of an alumina-silica base fiber having a very high mechanical strength, and excellent thermal properties and handleability making it suitable for insulation and reinforcement purposes at use temperatures of 2500 F. and higher.

In accordance with my invention, the improved fiber is obtained by the use of a special composition of starting materials in a salt decomposition fiber manufacturing process which will produce a fiber having a chemical analysis which is essentially a mullite composition plus a small amount of an acid oxide such as phosphorous pentoxide ($P_2O_5$), boria ($B_2O_3$), and/or titanium dioxide ($TiO_2$), and more particularly a calcined fiber having a chemical composition within the following analysis range:

|  | Percent by weight |
|---|---|
| $Al_2O_3$ | 68–80 |
| $SiO_2$ | 14–30 |
| Acid oxide | 1–10 |

The process of manufacture employed is generally similar to the salt decomposition fiber making process disclosed and claimed in my prior application, Ser. No. 345,855, filed Feb. 19, 1964, now abandoned, and involves the preparation of an aqueous viscous inorganic fiberizable solution or "mother liquid" made by the reaction of a basic aluminum compound with an equivalent weight of an acid aluminum salt, so that the solution can be concentrated to a relatively high viscosity and will contain a large amount of an ion which can be converted to a refractory oxide by calcining the fibers produced from the solution. The chlorides, nitrates, sulphates and hydroxides of aluminum are suitable for the process.

In accordance with the invention in said prior application, polycrystalline fibers can be made by forming a solution of one or more soluble metal salts which are characterized by a high viscosity, a high degree of solubility in the solvent selected, stability in a concentrated viscous condition, ability to decompose to the oxide on being heated to a sintering temperature, and low cost as commercially pure material. The salt or mixture of salts is dissolved and the solution concentrated to the desired viscosity by heating to a relatively low temperature, e.g. in the range of 100–450 F., until the amount of solvent is reduced to the desired amount. An essential feature of the process is that the concentrated solution while at substantially room temperature will have the fiberizing characteristics of a molten glass, particularly the ratio of viscosity to surface tension. The solution should also be substantially stable at room temperature when at the desired viscosity. With the desired stability, the salts or solids in the solution will not segregate by gravity in a 24-hour period, for example; the solutiton will not recrystallize for at least 24 hours, nor be affected by slight changes in temperature, impurities or humidity of the surrounding space. Stability of the solution is desirable for good reproducibility and for ease of storage and handling of the low temperature solution before actual fiber forming.

Another feature of such solutions is that they contain as high a solid content as possible, i.e. the percent of oxide or ceramic that can be formed from the salt when heated. The higher the solid content, the lower the shrinkage during processing and perhaps the greater the uniformity of fiber strength. A high solid content also insures longer filaments. It is essential that the fiber making composition containing a compound that will decompose and densify into a refractory oxide or mixture of oxides when the fibers are heated at a temperature substantially below the melting temperature of the oxide formed.

It is essential to commercial use that the fiberizable solution be in a condition and particularly at a viscosity which would make it suitable for the use of conventional fiberizing processes. For this reason, the heating is continued until the solution has a viscosity in the range of 1 to 1000 poises and preferably one suitable for the preferred fiberizing method employed. For example, if the viscous solution is to be discharged through an orifice and blown, the viscosity should be in the range of 2 to 50 poises. A range of 50 to 150 poises would be suitable for spinning the withdrawn solution, while a viscosity of 100 to 1000 poises would be suitable for drawing a mono-filament.

The space conditions surrounding the fiber formation are also of importance. The removal of the solvent is extremely important. The salts or colloidal mixtures are moisture-sensitive in that removing moisture increases the viscosity to a point that the solution tends to turn into a rigid amorphous solid. The large surface area possessed by the fibers enhance drying the fibers provided the moisture content (dew point) of the surrounding air is low enough. Control of the drying air is therefore necessary to insure the proper moisture content. Contact between the fibers while in a subdried state should be minimized and the fibers dried as quickly as possible. The fiberizing of such solution should take place in a space having a relative humidity less than 60% and preferably in the range of 20 to 30%. The temperature of the space is less important and may be in the range of 40 to 300 F., but preferably is at a room temperature above 90 F.

Removing the volatiles and rendering the fibers crystalline and strong by heating is the last step in the fiber production. The drying step removes most of the water in the fibers and even some of the anions in the salt solution, but higher temperatures are needed to convert the fibers into a crystalline ceramic form. After drying the fibers, they are heated rapidly to the temperature where the included salts decompose. This temperature depends on the composition of the salts used and is in the range of 1200–2500 F. and preferably in the range of 1500–1900 F. After the volatiles are removed and conversion to the oxide insured, the final sintering is designed to give the fibers maximum density with extremely fine crystals, substantially all being less than 500 A. Fibers with large crystals tend to be weak due to impurities concentrating at the grain boundaries as the crystal growth occurs. Large crystals are usually defined as crystals greater than 500 A. in size or 0.05 micron. The desired crystal size is in the range of 25–175 A. The calcined fibers are polycrystalline, transparent, of circular cross-section, the crystallite average size being 50–100 A., and highly refractory after this final heating.

In accordance with the present invention, a mother liquid consisting of a stable solution having a low surface tension and viscosity suitable for fiberization is first prepared. The mother liquid is preferably formed by dissolving high purity aluminum metal pellets in an aqueous solution of aluminum chloride, as this provides one of the lowest cost material per pound of contained $Al_2O_3$, has the potential of the speediest reaction, and can be easily transformed into the desired oxide by calcining. The aluminum metal acts as a basic aluminum compound. The following batch was first prepared:

To approximatley 1500 g. of aluminum chloride solution (Baumé 32°), 300 g. of aluminum metal pellets (¼–⅜″ diameter and 99.5% pure aluminum) and 2000 ml. of water were added. This mixture was heated for approximately two hours until the metal was substantially completely dissolved. The dross was then removed, by screening the solution through a cotton cloth. The resulting solution formed was water-clear and could be concentrated to any desired viscosity by evaporating the water. At a viscosity of 40–70 poises at room temperature (70 F.), the resulting solution will have an equivalent aluminum oxide content of 38–40% by weight, i.e. about four times that of the starting chloride solution.

The mother liquid as the viscosity stated will have a surface tension of about 74 dynes/cm. and a density of 1.55 g./cc. It can be fiberized if spun within 2–4 hours, but if left standing at room temperature, its viscosity rapidly increases, e.g. to 10,000 poises in a week. To provide the solution with a surface tension which will insure good fiberizability, i.e. less than 65 dynes/cm., a low surface tension liquid is added to the mother liquid. While ethyl or methyl alcohol and various ionic surface active aerosols were found to suppress surface tension, acetic acid is preferred. Besides reducing the surface tension, the addition of 0.2–1.5% glacial acetic acid was found to noticeably reduce excessive polymerization of the solution. While this solution was found to produce spun fibers which had exceptionally high green strength and good handleability, the linear shrinkage when heated above 2000° F. was found to be excessive. The crystalline phase, alpha alumina, developed at these temperatures may cause the reduced strength and quality of the fibers noted.

It has been found that the addition of 50 g. of acetic acid and 300 g. of basic aluminum acetate (a commercial water repellent chemical with the formula

$$Al(OH) \cdot (C_2H_3O_2) \cdot \tfrac{1}{3} H_3BO_3$$

to the described mother liquid substantially improves not only the viscosity stability but also increases the refractoriness of the fibers. When such a solution is concentrated to a viscosity of 40–80 poises at 70 F. and spun in a humidity range of 10–30% in an atmosphere above 90 F. and the spun fibers heated to 2200–2300 F., the fibers where white, glassy in appearance, flexible and had good handleability. Above 2300 F., the fibers tended to lose strength rapidly with any further increase in temperature. The improved handleability was believed due to the presence of 8–9% boria ($B_2O_3$) in the aluminum acetate to render it stable in hot water. The boria apparently develops a second crystalline phase in the fiber, perhaps an aluminum borate, which prevents the aluminum from transforming into the distinctive alpha alumina phase previously noted. To prove this point, about 50 g. of $H_3BO_3$ was mixed with a mother liquid and the mixture used to produce an $Al_2O_3$ fiber with several percent $B_2O_3$. The fibers were found to be more refractory and stronger than without such an addition.

An improved thermal stability and a higher abrasion resistance are needed to make such fibers suitable for continued use at temperatures of 2500 F. and above. In accordance with the invention, these properties are obtained by adding one or more acid oxides and preferably a substantial amount of an inorganic silicon containing compound such as colloidal silica ($SiO_2$) or silicic acid and small amounts of, or compounds containing, boria ($B_2O_3$) and/or phosphorous pentoxide ($P_2O_5$), to the mother liquid. For example, a successful 2500 F. fiber has been obtained by forming a mother liquid containing 1400 g. of Baumé 32° aluminum chloride solution containing the equivalent of 10.6% $Al_2O_3$, 2000 ml. of $H_2O$ and 280 g. of aluminum pellets dissolved therein. To this solution 50 g. acetic acid, 575 g. of 40% sol of colloidal $SiO_2$ having a particle size less than 25 millimicrons and less than 1% oxide impurities, 10–20 g. of $H_3PO_4$ and 50–80 g. $H_3BO_3$ were added. Silicic acid ($Si(OH)_4$) made by deionizing sodium silicate, using a hydrogen exchange resin, can be added as equivalent weight of $SiO_2$. The solution was concentrated to a viscosity of 60–90 poises at 70 F. and fiberized in a spinning machine. The resulting spun fibers, when dried and uniformly heated up to 1850–1900 F., were found to have a chemical composition approximately as follows:

| | Percent by weight |
|---|---|
| $Al_2O_3$ | 68–70 |
| $SiO_2$ | 21–23 |
| $B_2O_3$ | 4–6 |
| $P_2O_5$ | 1–2 |

The calcined fibers were water-clear and flexible and found to have very good thermal stability, having when heated to 2500 F. for two hours, less than 2% linear shrinkage. The presence of such amounts of colloidal silica tends to reduce the reheat stability. However, the inclusion of the $B_2O_3$ and $P_2O_5$ in the percentages noted largely offsets this tendency. The tensile strength of the individual fibers is about 175,000 p.s.i. after heating to 2500 F., indicating high strength and abrasion resistance.

The following test data was developed.

Crystalline constitution and size:
  Mullite, major phase
  Crystallite size—300 A. after 2500° F. soak—2 hrs.
Physical property of fibers:
  (a) Tensile strength:
    After 1850 F. exposure (as made)—350,000 p.s.i. avg. (20 samples)
    After 2500 F. exposure (2 hrs.)—180,000 p.s.i. avg. (20 samples)
  (b) Fiber length—shorts to 10" lengths
  (c) Fiber diameter—3.0 to 5.0 microns avg.
  (d) Fiber density—2.85 to 2.90 g./cc.
  (e) Index of refraction—1.59 $N_{wl}$ (white light)
  (f) Modulus of elasticity—$25 \times 10^6$ p.s.i.
Properties of bulk form:
  (a) Bulk density, as made—0.7 to 0.8 lb./cu. ft.
  (b) Thermal properties:
    (1) Thermal stability—shrinkage, after initial 1850 F.—5 min. soak

| Soak temperature (2 hrs.): | Percent shrinkage (avg. 2 directions) |
|---|---|
| 2400 F. | 0.2 |
| 2500 F. | 1.0 |
| 2600 F. | 4.5 |
| 2700 F. | 7.5 |

(2) Reheat stability—shrinkage, after initial 2500 F.—2 hr. soak
      2500 F. (12 hrs)—1.0% shrinkage
    (3) Weight loss—after initial 1850 F.—5 min. soak

| Soaking temperature (2 hrs.): | Wt. loss, percent |
|---|---|
| 2400 F. | 0.2 |
| 2500 F. | 0.3 |
| 2700 F. | 0.4 |

(4) Thermal conductivity.—Thermal conductivity of fibrous bulk insulation at 3.2, 6.6, 7.1 and 7.7 lbs./ft.³ was measured on a polycrystalline fiber of similar chemical properties but with a use limit to 2800 F. The expected difference in thermal conductivity between these two materials should be small, and the thermal conductivity of the 2500 F. fiber was computed to be as follows for a mat having a density of 7.7 lbs./cu. ft. and its cold face normalized for 100 F.

| Hot face temp. (F.): | Mean K (B.t.u./hr.-ft.²– ° F./in.²) |
|---|---|
| 500 | 0.31 |
| 1000 | 0.43 |
| 1500 | 0.62 |
| 2000 | 0.91 |
| 2500 | 1.29 |
| 2800 | 1.57 |

A generally similar fiber suitable for use at temperatures up to 2800 F. was manufactured as follows:

To approximately 1400 g. of aluminum chloride solution containing the equivalent of 10.6% $Al_2O_3$, 2000 g. of $H_2O$, 400 g. of a 40% sol of colloidal silica, 20 g. of $H_3PO_4$ and 280 g. of aluminum metal pellets were added and the mixture heated until the metal was substantially completely dissolved. The solution was screened, the dross removed and to the resulting liquid 75 g. of acetic acid and 75 g. of boric acid were added and the solution concentrated to the described viscosity for spinning. The solution was then fiberized and the fibers calcined as previously described. The following test data was obtained:

Chemical composition

The calcined fiber was calculated to have a chemical composition within the following range:

| | Percent |
|---|---|
| $Al_2O_3$ | 75–79 |
| $SiO_2$ | 15–18 |
| $B_2O_3 + P_2O_3$ | 4–9 |

Physical properties

Tensile strength:
  After exposure to 1850 F.—300,000 p.s.i. average
  After exposure to 2500 F.—125,000 p.s.i. average
  After exposure to 2800 F.—40,000 p.s.i. average
Fiber length—shorts to 6"
Fiber diameter—3.0 to 5.0 microns
Fiber density—2.95 to 3.05 g./cc.
Index of refraction—1.57 $N_{wl}$ (measured under white light)
Crystallite size—500 A. (after heating to 2800 F., mullite phase)
Bulk density—0.6 to 0.8 lb./cu. ft.
Modulus of elasticity—6 to $30 \times 10^6$ p.s.i.

Thermal stability

The effect of a 2 hour soak at temperature upon the average linear shrinkage of the 2800 F. fiber which had been previously subjected to 1850 F. for less than 5 minutes is as follows:

| 2 hr. soaking temperature (F.): | Linear shrinkage in percent |
|---|---|
| 2500 | 0.4 |
| 2800 | 1.6 |
| 2900 | 4.1 |

Thermal conductivity

The thermal conductivity values were those listed supra for the 2500 F. fiber.

In general, the starting mixture should have approximately the following composition:

| | Percent by weight |
|---|---|
| Aluminum chloride solution | 25–35 |
| Aluminum metal pellets | 5–6 |
| Water | 40–45 |
| Silicon-containing compound | 10–25 |
| Acid oxide | 1–2 |
| Surface tension reducing material | .5–1.5 |

The above described compositions may also be extruded and drawn to form fibers of a length limited substantially only by the amount of material available, while still retaining the same general physical characteristics found with spun fibers.

The described process produces a polycrystalline fiber with a predominant phase of mullite. The fibers are semicontinuous, transparent, of circular cross-section, and a diameter greater than 0.5 micron. The calcined fibers have a crystallite size greater than 25 A. and less than 500 A., averaging between 50 and 100 A. Thus a fiber of 5 microns diameter would have as many as 500 crystals across its diameter, rendering it very flexible. This extremely fine crystallite size contributes to the fibers having very high tensile strength, and excellent thermal properties, handleability and abrasion resistance.

What is claimed is:
1. The method of making alumina-silica base refractory fibers suitable for use at a temperature of 2500° F. which comprises dissolving aluminum metal in an aqueous solution of aluminum chloride to form a mother liquid, adding a low surface tension liquid selected from one of the group of ethyl alcohol, methyl alcohol and acetic acid to the mother liquid to reduce surface tension of the solution, adding to the mother liquid an inorganic silicon-containing compound selected from the group of colloidal silica and silicic acid and a smaller amount of an acid oxide selected from the group of boric oxide, phosphorous pentoxide, and titanium dioxide, concentrating the solution by the evaporation of water to a viscosity suitable for fiberizing, fiberizing the concentrated solution, drying the fibers, calcining the dried fibers at a temperature in the range of 1200–2500° F. at which the included aluminum salts will decompose to aluminum oxide to produce fibers having a chemical composition including by weight 68–80% aluminum oxide, 14–30% silicon dioxide, and 1–10% acid oxide.

2. The method of making an alumina-silica base refractory fiber as claimed in claim 1 in which the low surface tension liquid is acetic acid.

3. The method of making an alumina-silica base refractory fiber as claimed in claim 1 in which the acid oxide added to the mother liquid is boric oxide and phosphorous pentoxide.

4. The method of making an alumina-silica base refractory fiber as claimed in claim 1 in which the chemical composition of the calcined fiber is 68–70% aluminum oxide, 21–23% silicon dioxide, 4–6% boric oxide and 1–2% phosphorous pentoxide by weight.

5. The method of making an alumina-silica base refractory fiber as claimed in claim 1 in which the chemical composition of the calcined fibers is 75–79% aluminum oxide, 15–18% silicon dioxide, and 4–9% boric oxide plus phosphorous pentoxide.

6. A polycrystalline alumina-silica base calcined fiber having a chemical composition in the weight range of 68–80% $Al_2O_3$, 14–30% $SiO_2$, and 1–10% of an acid oxide selected from the group $B_2O_3$, $P_2O_5$ and $TiO_2$, and characterized by high strength and thermal stability and low thermal conductivity at a use temperature of 2500° F., a length less than 6", and having a predominant mullite crystalline phase with an average crystallite size in the range of 50–100 A.

7. A polycrystalline alumina-silica base calcined fiber as claimed in claim 6 having a chemical composition in the weight range of 68–70% $Al_2O_3$, 21–23% $SiO_2$, 4–6% $B_2O_3$, and 1–2% $P_2O_5$.

8. A polycrystalline alumina-silica base calcined fiber as set forth in claim 6 having a chemical composition in the weight range of 75–79% $Al_2O_3$, 15–18% $SiO_2$ and 4–9% $B_2O_3$ plus $P_2O_5$.

9. A polycrystalline alumina-silica base calcined fiber having a chemical composition in the weight range of 68–80% $Al_2O_3$, 14–30% $SiO_2$, and 1–10% of an acid oxide selected from the group $B_2O_3$, $P_2O_5$ and $TiO_2$, and characterized by high strength and thermal stability and low thermal conductivity at a use temperature of 2500° F., and having a predominant mullite crystalline phase with an average crystallite size in the range of 50–100 A.

References Cited

UNITED STATES PATENTS

| 2,695,849 | 11/1954 | McMullen | 106—65 |
| 2,710,261 | 6/1955 | McMullen | 106—65 |
| 3,082,099 | 3/1963 | Beasley | 106—39 |
| 3,180,741 | 4/1965 | Wainer et al. | 23—139 X |
| 3,310,413 | 3/1967 | Harrington | 106—50 |
| 3,449,137 | 6/1969 | Ekdahl | 106—50 |
| 3,311,481 | 3/1967 | Sterry et al. | 106—50 |
| 3,322,865 | 5/1967 | Blaze | 23—139 |

S. LEON BASHORE, Primary Examiner

R. L. LINDSAY, Assistant Examiner

U.S. Cl. X.R.

23—139; 65—2; 106—69